(12) United States Patent
Park et al.

(10) Patent No.: US 11,200,490 B2
(45) Date of Patent: Dec. 14, 2021

(54) PROCESSING GROUP CONVOLUTION IN NEURAL NETWORK PROCESSOR

(71) Applicant: Apple Inc., Cupertino, CA (US)

(72) Inventors: Sung Hee Park, Cupertino, CA (US); Seungjin Lee, Los Gatos, CA (US); Christopher L. Mills, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 895 days.

(21) Appl. No.: 15/971,635

(22) Filed: May 4, 2018

(65) Prior Publication Data

US 2019/0340502 A1    Nov. 7, 2019

(51) Int. Cl.
*G06N 3/08* (2006.01)
*G06N 3/04* (2006.01)
*G06N 3/06* (2006.01)

(52) U.S. Cl.
CPC ............. *G06N 3/08* (2013.01); *G06N 3/0454* (2013.01); *G06N 3/06* (2013.01)

(58) Field of Classification Search
CPC ........... G06N 3/08; G06N 3/0454; G06N 3/06
See application file for complete search history.

(56) References Cited

U.S. PATENT DOCUMENTS 10,460,230 B2 * 10/2019 Brothers .............. G06N 3/0454
2016/0162402 A1    6/2016 Woolley, Jr. et al.
2017/0316312 A1   11/2017 Goyal et al.
2017/0344880 A1   11/2017 Nekuii
2019/0220742 A1 *  7/2019 Kuo ..................... G06N 3/0481

OTHER PUBLICATIONS

Lu et al., "FlexFlow: A Flexible Dataflow Accelerator Architecture for Convolutional Neural Networks," 2017, IEEE International Symposium on High Performance Computer Architecture, pp. 553-564 (Year: 2017).*
Shafiee et al., "ISAAC: A Convolutional Neural Network Accelerator with In-Situ Analog Arithmetic in Crossbars," 2016, ACM/IEEE 43rd Annual International Symposium on Computer Architecture, pp. 14-26 (Year: 2016).*
Du, L., et al., "A Reconfigurable Streaming Deep Convolutional Neural Network Accelerator for Internet of Things," IEEE Transactions on Circuits and Systems I: Regular Papers Year: 2017, vol. PP, Issue: 99, pp. 1-10.

* cited by examiner

*Primary Examiner* — Miranda M Huang
*Assistant Examiner* — Catherine F Lee
(74) *Attorney, Agent, or Firm* — Fenwick & West LLP

(57) ABSTRACT

Embodiments relate to a neural processor circuit including neural engines, a buffer, and a kernel access circuit. The neural engines perform convolution operations on input data and kernel data to generate output data. The buffer is between the neural engines and a memory external to the neural processor circuit. The buffer stores input data for sending to the neural engines and output data received from the neural engines. The kernel access circuit receives one or more kernels from the memory external to the neural processor circuit. The neural processor circuit operates in one of multiple modes, at least one of which divides a convolution operation into multiple independent convolution operations for execution by the neural engines.

20 Claims, 11 Drawing Sheets

PROCESSING GROUP CONVOLUTION IN NEURAL NETWORK PROCESSOR

BACKGROUND

1. Field of the Disclosure

The present disclosure relates a circuit for performing convolution neural network and more specifically to processing group convolution operations in a neural network processor.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, number of channels in input data, kernel data to be used, non-linear function to be applied to convolution result, and applying of various post processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural processor circuit that may operate in a mode where a convolution operation is divided into multiple independent convolution operations. The neural processor circuit includes neural engines, a buffer, and a kernel access circuit. The neural engines perform convolution operations on input data and kernel data to generate output data. The buffer is placed between the neural engines and a memory external to the neural processor circuit. The buffer stores input data for sending to the neural engines and output data received from the neural engines. The kernel access circuit receives one or more kernels from the memory external to the neural processor circuit. The neural processor circuit operates in one of multiple modes. In at least one of the modes, the neural processor circuit divides a convolution operation into multiple independent convolution operations that is executed by the neural engines.

In one embodiment, the modes include a group convolution mode in which the independent convolution operations are executed sequentially by the neural engines.

In one embodiment, the modes includes a group convolution mode in which at least a subset of the independent convolution operations are executed in parallel by the neural engines, and each of the neural engines receives different portions of input data from the buffer via unicast and different kernels from the kernel access circuit.

In one embodiment, the modes include a batch mode in which each of the independent convolution operations is performed by the neural engines that receives a same kernel from the kernel access circuit.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural processor circuit for operating in various modes including a group convolution mode where a single convolution operation is divided into multiple independent convolution operations. The neural processor circuit includes multiple neural engines to which independent convolution operations divided from the single convolution mode are allocated in various ways. One of the group convolution mode involves executing the independent convolution operations sequentially by the neural engines. In another group convolution mode, at least a subset of the independent convolution operations are executed in parallel by the neural engines.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
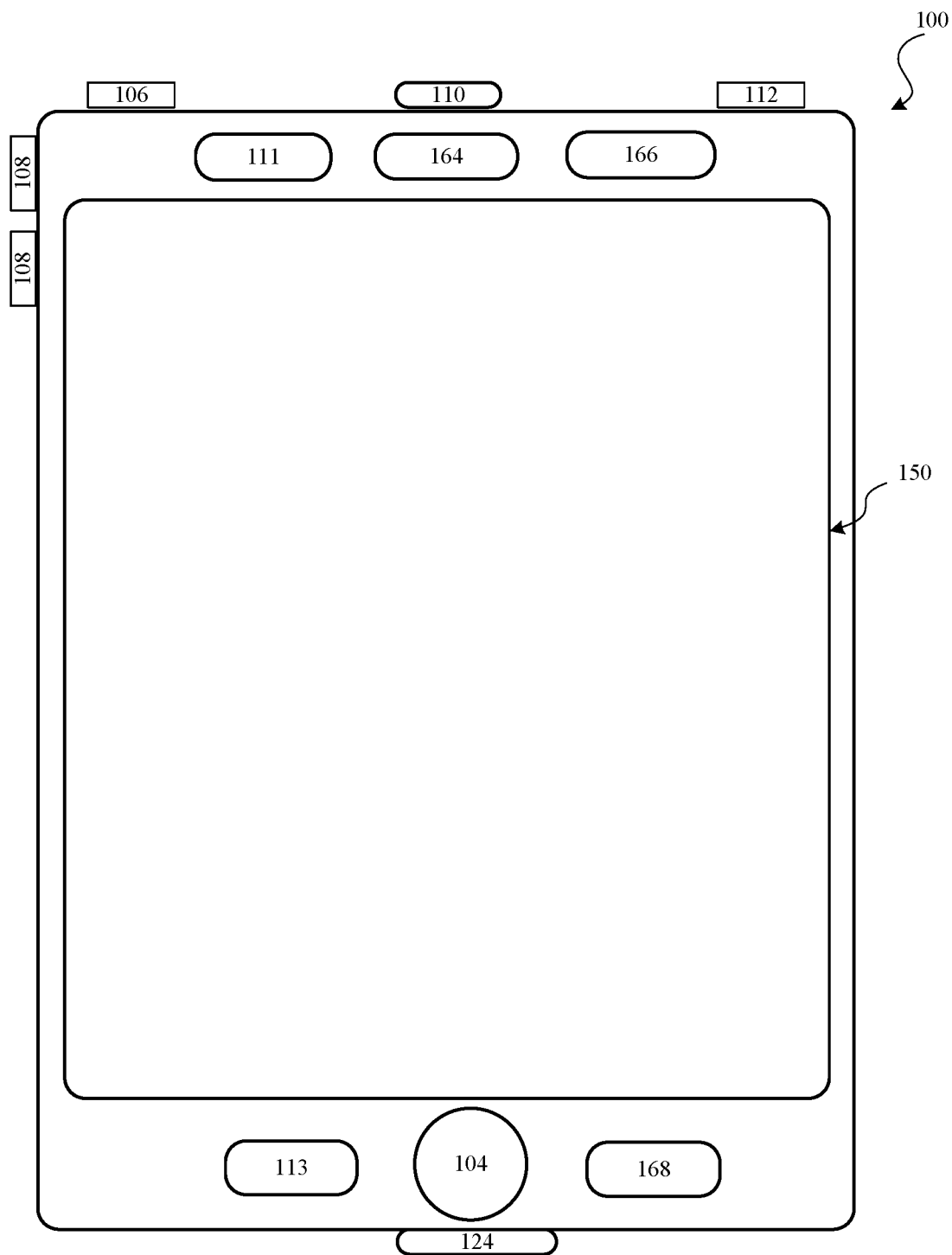
FIG. 1 is a high-level diagram of an electronic device, according to one embodiment.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
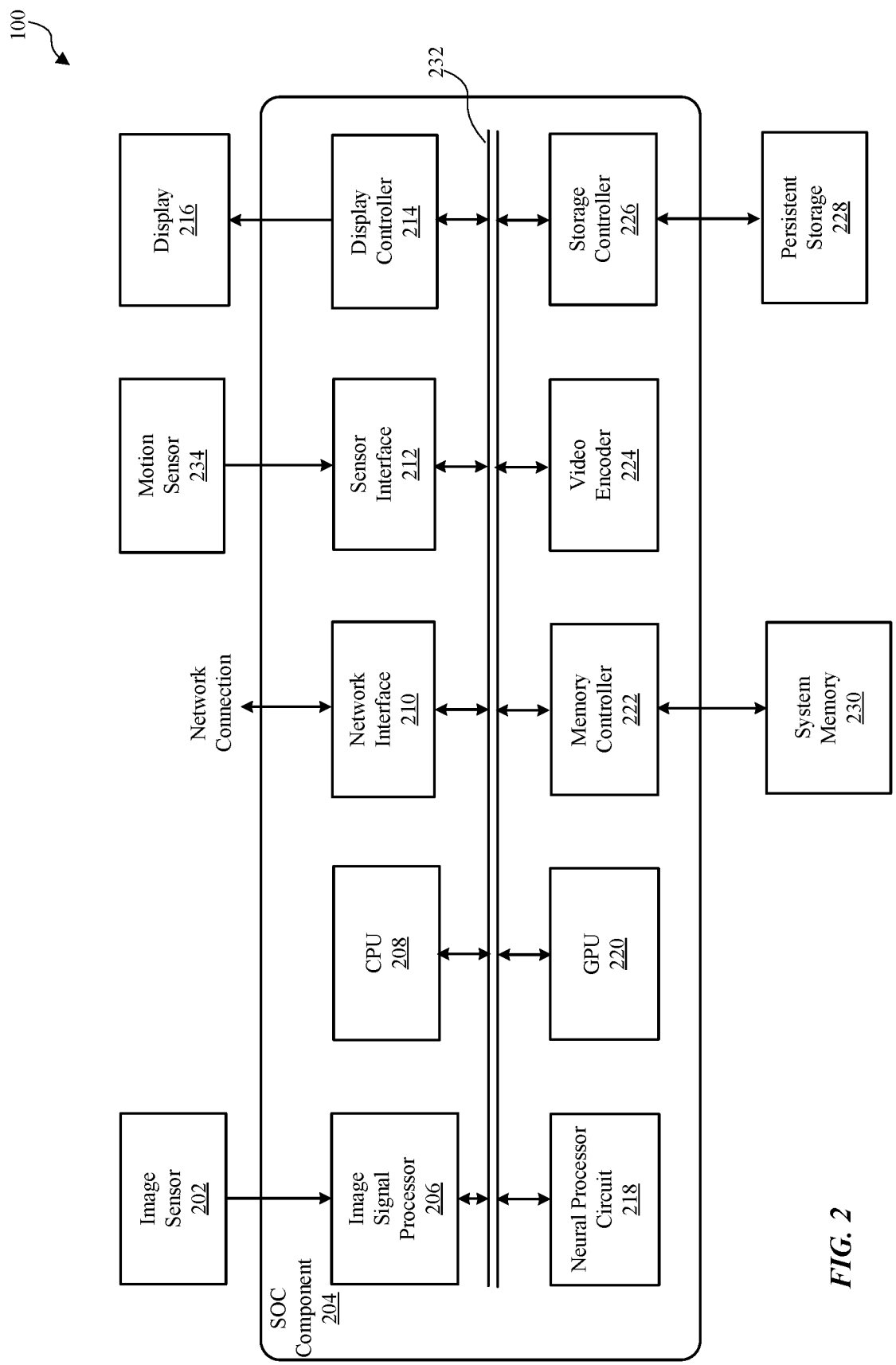
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computations including multiplication, adding and accumulation. Such computations may be arranged to perform, for example, convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 302, the image signal processor 206, system memory 230 or other sources such as network interface 210 or GPU 220. The output of neural processor circuit 218 may be provided to various components of device 100 such as the image signal processor 206, system memory 230 or CPU 208 for various operations. The structure and operation of neural processor circuit 218 is described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

Example Neural Processor Circuit

Neural processor circuit 218 is a configurable circuit that performs neural network operations on the input data based at least on kernel data 340. For this purpose, neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data buffer 318 and buffer DMA 320. Neural processor circuit 218 may include other components not illustrated in FIG. 3.

Each of neural engines 314 performs computing operations for neural network operations in parallel. Depending on the load of operation, entire set of neural engines 314 may be operated or only a subset of the neural engines 314 may be operated while the remaining neural engines 314 are placed in a power save mode to conserve power. Each of neural engines 314 includes components for storing one or more kernels, for performing multiply-accumulate operations, and for post-processing to generate an output data 328, as described below in detail with reference to FIG. 4. One example of a neural network operation is a convolution operation.

Figure 3:
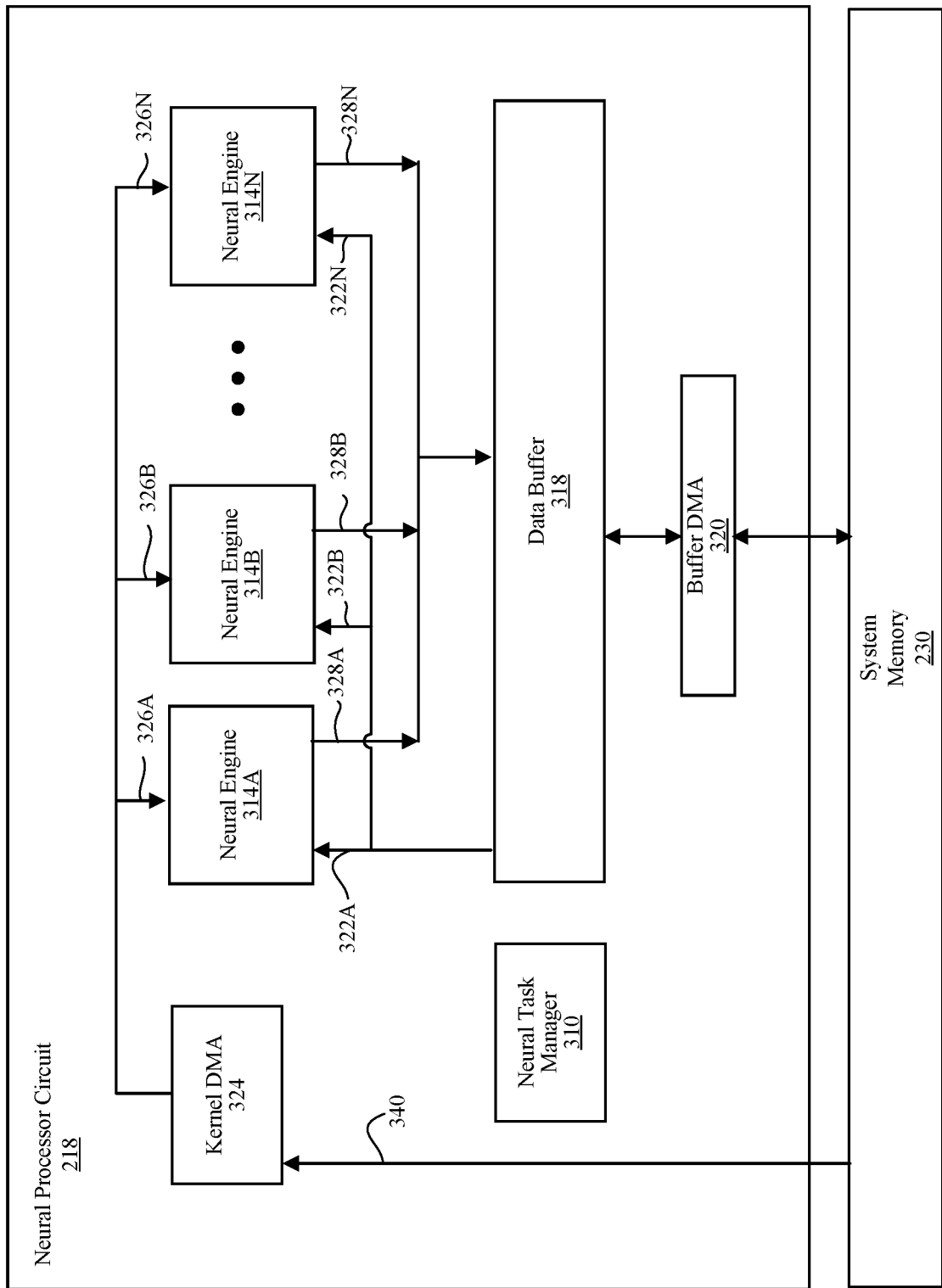
FIG. 3 is a block diagram illustrating a neural processor circuit, according to one embodiment.

Neural task manager 310 manages the overall operation of neural processor circuit 218. Neural task manager 310 may receive a task list from a compiler executed by CPU 208, store tasks in its task queues, choose a task to perform, and send instructions to other components of the neural processor circuit 218 for performing the chosen task. Neural task manager 310 may also perform switching of tasks on detection of events such as receiving instructions from CPU 208. In one or more embodiments, the neural task manager 310 sends rasterizer information to the components of the neural processor circuit 218 to enable each of the components to track, retrieve or process appropriate portions of the input data and kernel data, as described below in detail with reference to FIGS. 5 through 7. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances.

Data buffer 318 is a temporary storage for storing data associated with the neural network operations. In one embodiment, data buffer 318 is embodied as a memory that can be accessed by all of the neural engines 314. Data buffer 318 may store input data 322A through 322N for feeding to corresponding neural engines 314A through 314N, as well as output from each of neural engines 314A through 314N for feeding back into neural engines 314 or sending to a target circuit (e.g., system memory 230). The operations of data buffer 318 and other components of the neural processor circuit 218 are coordinated so that the input data and intermediate data stored in the data buffer 318 is reused across multiple operations at the neural engines 314, and thereby reduce data transfer to and from system memory 230. Data buffer 318 may be operated in a broadcast mode where data input data of all input channels are fed to all neural engines 314 or in a unicast mode where data input data of a subset of input channels are fed to each neural engine 314.

The input data 322 stored in data buffer 318 be part of, among others, image data, histogram of oriented gradients (HOG) data, audio data, meta data, output data 328 of a previous cycle of the neural engine 314, and other processed data received from other components of the SOC component 204.

Buffer DMA 320 includes a read circuit that receives a portion (e.g., tile) of the input data from a source (e.g., system memory 230) for storing in data buffer 318, and a write circuit that forwards data from data buffer 138 to a target (e.g., system memory).

Example Neural Engine Architecture

Figure 4:
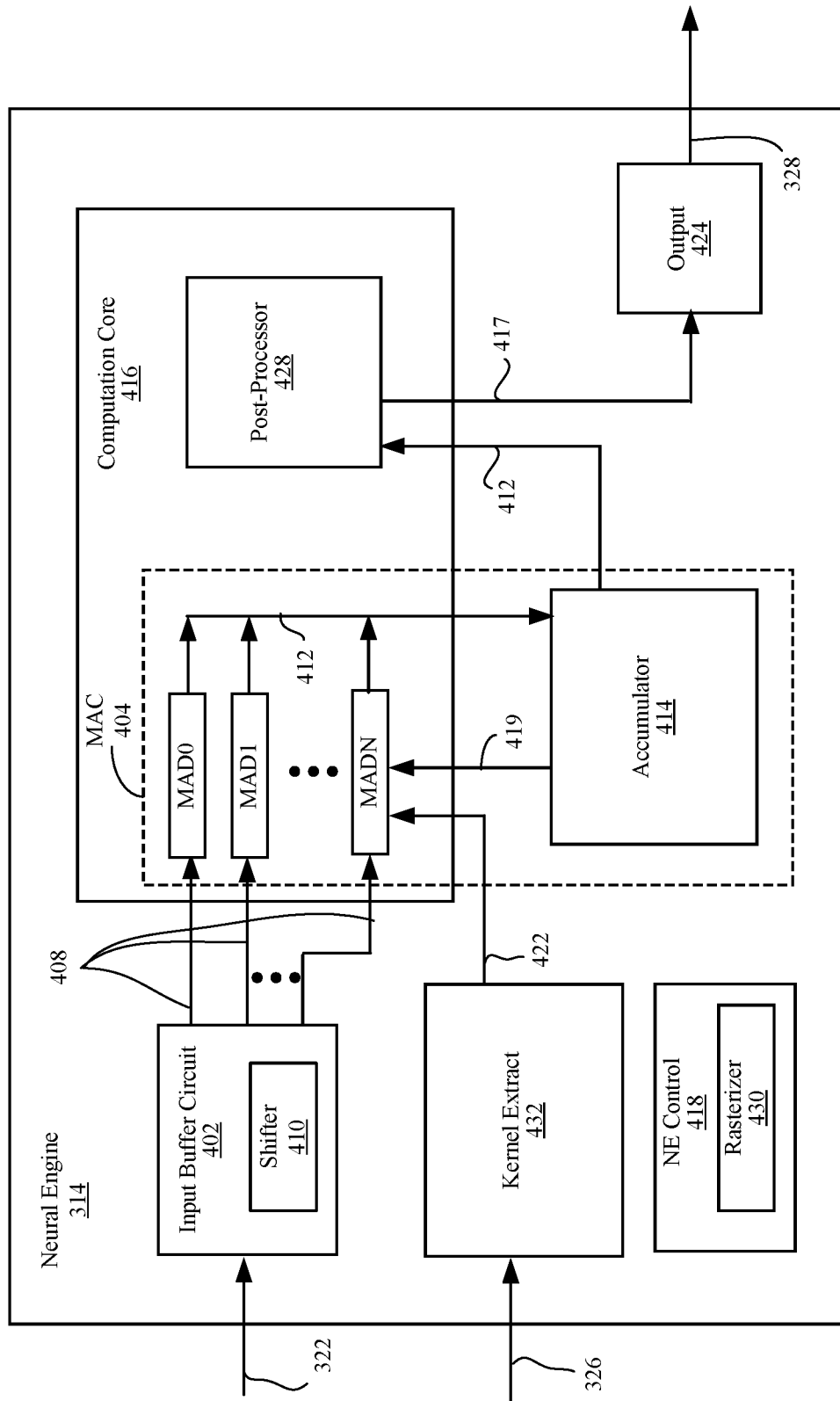
FIG. 4 is a block diagram of a neural engine in the neural processor circuit, according to one embodiment.

FIG. 4 is a block diagram of the neural engine 314, according to one embodiment. The neural engine 314 performs various operations to facilitate neural network operations such as convolution, spatial pooling and local response normalization. The neural engine 314 receives the input data 322, performs multiply-accumulate operations (e.g., convolution operations) on the input data 322 based on stored kernel data, performs further post-processing operations on the result of the multiply-accumulate operations, and generates the output data 328. The input data 322 and/or the output data 328 of the neural engine 314 may be of a single channel or multiple channels.

Neural engine 314 may include, among other components, input buffer circuit 402, computation core 416, neural engine (NE) control 418, kernel extract circuit 432, accumulators 414 and output circuit 424. Neural engine 314 may include further components not illustrated in FIG. 4.

Input buffer circuit 402 is a circuit that stores a portion of the input data 322 as it is received from the data buffer 318 and sends an appropriate portion 408 of input data for a current task or process loop to computation core 416 for processing. Input buffer circuit 402 includes a shifter 410 that shifts read locations of input buffer circuit 402 to change the portion 408 of input data sent to computation core 416. By changing portions of input data provided to the computation core 416 via shifting, neural engine 314 can perform multiply-accumulate for different portions of input data based on fewer number of read operations. In one or more embodiments, the input data 322 includes data of different convolution groups and/or input channels.

Kernel extract circuit 432 is a circuit that receives kernel data 326 from kernel DMA 324 and extracts kernel coefficients 422. In one embodiment, the kernel extract circuit 432 references a look up table (LUT) and uses a mask to reconstruct a kernel from compressed kernel data 326. The mask indicates locations in the reconstructed kernel to be padded with zero and remaining locations to be filled with numbers. The kernel coefficients 422 of the reconstructed kernel are sent to computation core 416 to populate register in multiply-add (MAD) circuits of computation core 416. In other embodiments, the kernel extract circuit 432 receives kernel data in an uncompressed format and the kernel coefficients are determined without referencing a LUT or using a mask.

Computation core 416 is a programmable circuit that performs computation operations. For this purpose, the computation core 416 may include MAD circuits MAD0 through MADN and a post-processor 428. Each of MAD circuits MAD0 through MADN may store an input value in the portion 408 of the input data and a corresponding kernel coefficient in the kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to MAC circuit while data stored in a second subunit of accumulator 414 is sent to post-processor 428.

Post-processor 428 is a circuit that performs further processing of values 412 received from accumulator 414. The post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from the post-processor 428 as processed values 417 to output circuit 424.

NE control 418 controls operations of other components of the neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post processor 428. To configure components of the neural engine 314 to operate in a desired manner, the NE control 418 sends control signal to components of the neural engine. NE control 418 may also include rasterizer 430 that tracks the current task or process loop being processed at neural engine 314, as described below in detail with reference to FIG. 5 through 7.

Output circuit 424 receives processed values 417 from the post-processor 428 and interfaces with data buffer 318 to store processed values 417 in data buffer 318. For this purpose, output circuit 424 may send out as output data 328 in a sequence or a format that is different from the sequence or format in which the processed values 417 are processed in post-processor 428.

The components in the neural engine 314 may be configured during a configuration period by the NE control 418 and the neural task manager 310. For this purpose, the neural task manager 310 sends configuration information to the neural engine 314 during the configuration period. The configurable parameters and modes may include, but are not limited to, mapping between input data elements and kernel elements, the number of input channels, the number of output channels, performing of output strides, and enabling/selection of post-processing operations at the post processor 428.

Operation of Segmenting of Data for Processing at Neural Processor Circuit

Input data is typically split into smaller pieces of data for parallel processing at multiple neural engines 314. Often multiple cycles of operations are performed to generate output for a task associated with a neural network. A compiler executed by CPU 208 analyzes the hierarchy and nodes of the neural network and determines how the input data is to be segmented based on the hardware constraints of the neural processor circuit 218. One of functions of the compiler is to determine how input data is to be split into smaller data units for processing at the neural engines 314, and how the processing is to be iterated in loops to produce the result for tasks.

Figure 5:
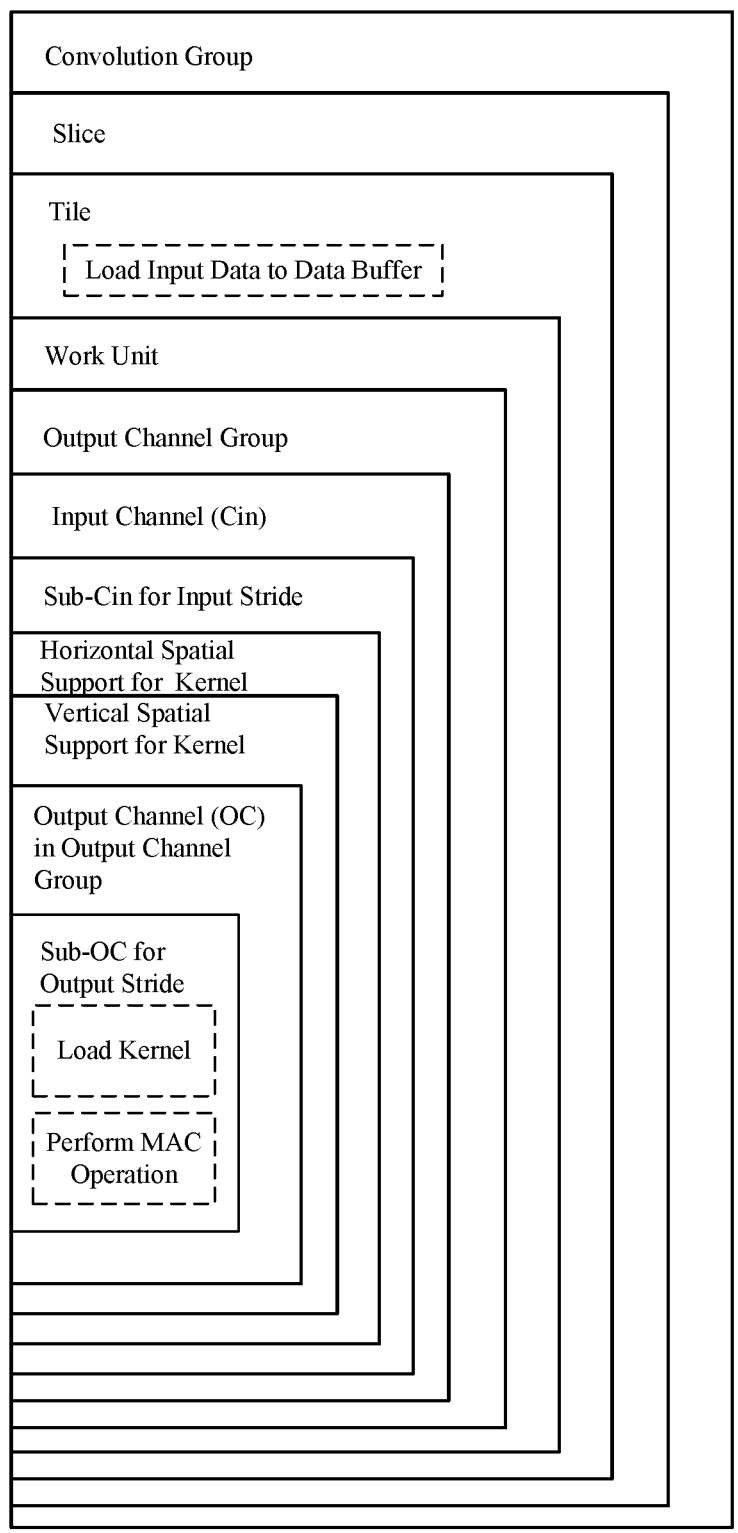
FIG. 5 is a conceptual diagram illustrating loops for processing input data at the neural processor circuit, according to one embodiment.

FIG. 5 is a conceptual diagram illustrating loops for processing the input data at neural processor circuit 218, according to one embodiment. The outermost loop represents processing for a convolution group, if group convolution involving multiple convolution group is used. Group convolutions are convolutions where input data of the input channels in each group are used only for generating output data of output channels of each group but are not used for generating output data for output channels of other groups. Hence, each group of the group convolution can be treated as a separate convolution operation.

Figure 6:
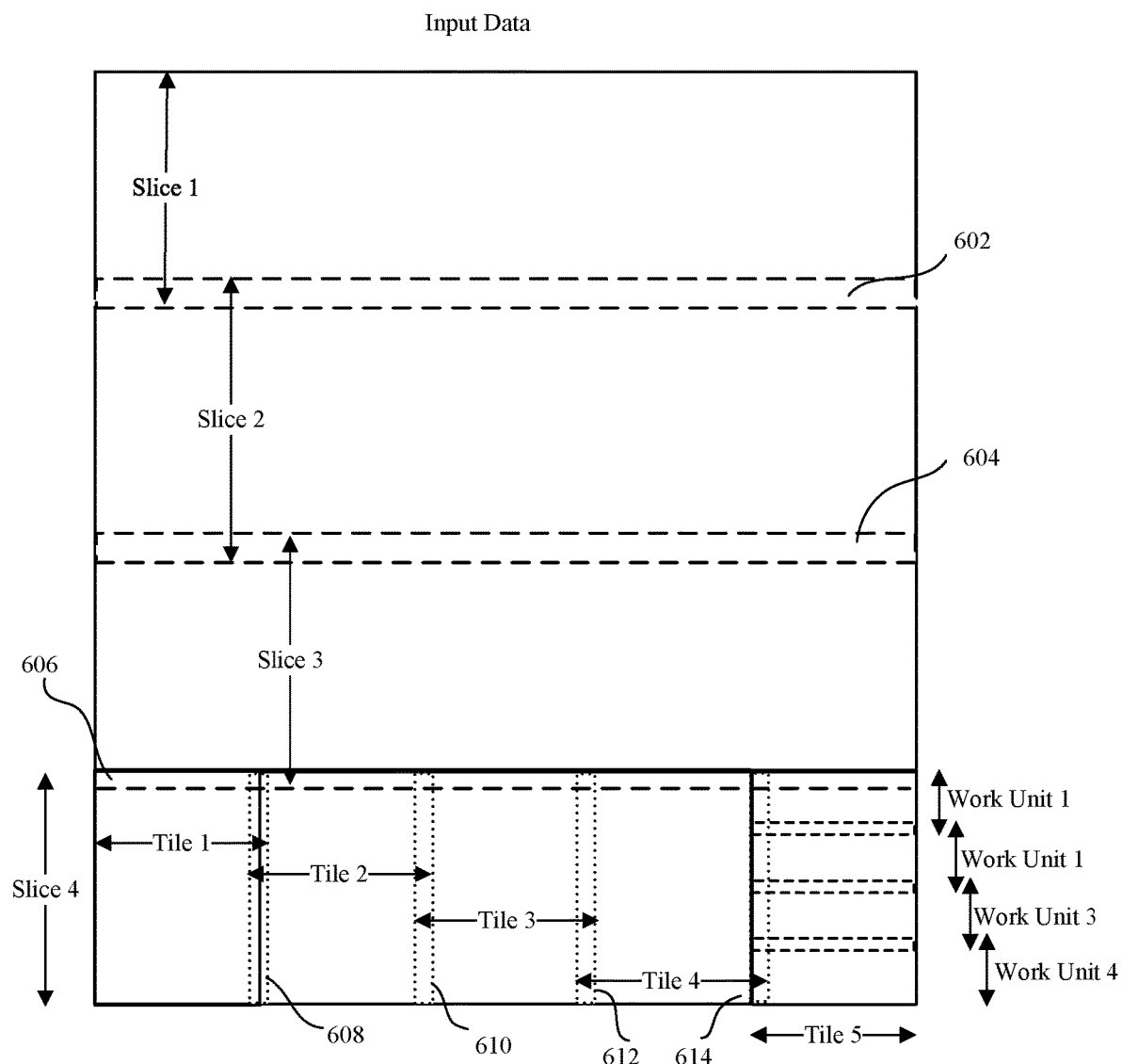
FIG. 6 is a conceptual diagram illustrating segmenting the input data into slices, tiles and work units, according to one embodiment.

In the loop for each convolution group is a processing loop for a slice of the input data. The entire input data for a convolution operation is segmented into multiple strips of slices in an overlapping manner, as shown in FIG. 6. The overlapping portions 602, 604, 606 are parts of the input data that are overfetched in two adjacent slices to provide spatial support for a corresponding kernel. The second outermost loop performs convolution operation for each slice in the input data. Within the loop for a slice is a processing loop for a tile of the slice. Each slice is segmented into a plurality of tiles, as shown in FIG. 6. The overlapping portions 608, 610, 612, 614 are parts of the input data in slice 4 that are overfetched in two adjacent tiles to provide spatial support for a corresponding kernel. The rightmost tile will typically have a width smaller than other tiles of the slice. In one embodiment, input data for each tile is loaded onto data buffer 318 in a read cycle and reused for operations in processing loops for the tile. In the processing loop for the tile is a processing loop for a work unit. Each tile is segmented into multiple work units as shown in FIG. 6. A work unit is a portion of the input data having a size that produces output values that fit into accumulator 414 of neural engine 314 during a single cycle of the computation core 416. Although the shape of each work unit is shown as a horizontal strip in FIG. 6, the shape of the work unit can be different depending on the shape and size of the tile. The work units also have overlapping parts that represent overfetched to provide support for a corresponding kernel. Especially, work units for the last tile of a slice may have a shape of a vertical strip if the tile is tall. In one or more embodiments, the size of each work unit is 256 bytes. In such embodiments, for example, work units can be shaped to one of 16×16, 32×8, 64×4, 128×2 or 256×1 dimension.

For each work unit, an internal processing loop may be provided for an output channel group (OCG). The number of output channels produced for a given work unit by a single cycle of the computation core 416 is referred to as an OCG. Depending on operation modes, each neural engine 314 may process output data of different numbers of output channels (e.g., 8 channels, 32 channels) for a single load of input data into its input buffer circuit 402.

For each output channel group, an internal processing loop may be provided for an input channel (Cin). If an input stride is implemented to skip certain input data, loops for sub-input channels (Sub-Cin) may be provided within the processing loop for the input channel (Cin).

For each input channel or each sub-input channel, internal loops are provided for processing horizontal spatial support for a kernel and the vertical support within each horizontal spatial support. The spatial support refers to the input data for convolution with the kernel, and includes overfetched input data for performing convolution at the edges of the input data.

Overfetch refers to fetching additional input data in current slice, tile or work unit so that proper dimension of input data can be provided for convolution with a kernel. In one or more embodiments, overfetch is performed vertically between slices to obtain additional rows of input data (shown as overlapping portions 602, 604, 606 in FIG. 6), horizontally between tiles to obtain additional columns of input data (shown as overlapping portions 608, 606, 612, 614 in FIG. 6), and vertically between work units within a tile to obtain additional rows of input data.

For each spatial support for the kernel, an internal processing loop for an output channel (OC) is provided to generate output data for each output channel (Cout). In cases where output stride implements a spatial upsampling, an additional inner loop for processing each sub-output channel is provided. Loading of kernel coefficients and MAC operations are performed within the loop for the output channel (OC) or sub-output channel if an output stride is implemented, to generate output data for the output channel (OC) or sub-output channel.

The nested loop structure of FIG. 5 is merely illustrative. Loops may be omitted, added or structured differently depending on various factors. For example, if only a single convolution group is used, the outermost loop may be removed. Further, the loop structure for the horizontal spatial support and the vertical spatial support may be reversed.

In one or more embodiments, the operations associated dividing the input space into smaller units and processing these smaller units as described above with reference to FIGS. 5 and 6 are performed by rasterizers 714, 718, 720, 722 in various components of neural processor circuit 218. A rasterizer is a circuit in various components of neural processor circuit 218 that keeps track of the segment of the input/output data (e.g., group, work unit, input channel, output channel) and instructs the components of neural processor circuit for proper handling of the segment of the input data. For example, rasterizer 720 in buffer DMA 320 tracks tiles and slices received from system memory 230 while rasterizer 718 in data buffer 318 broadcasts in sequence work units for processing by the neural engines 314. Rasterizer 724 in kernel DMA 324 determines which kernels are to be received and distributed to neural engines 314, while rasterizers 714 in neural engines 314 operate shifters 410 in input buffer circuits 402 to forward correct portions 408 of input data to MAC 404, and send the finished output data 328 to the data buffer 318.

Figure 7:
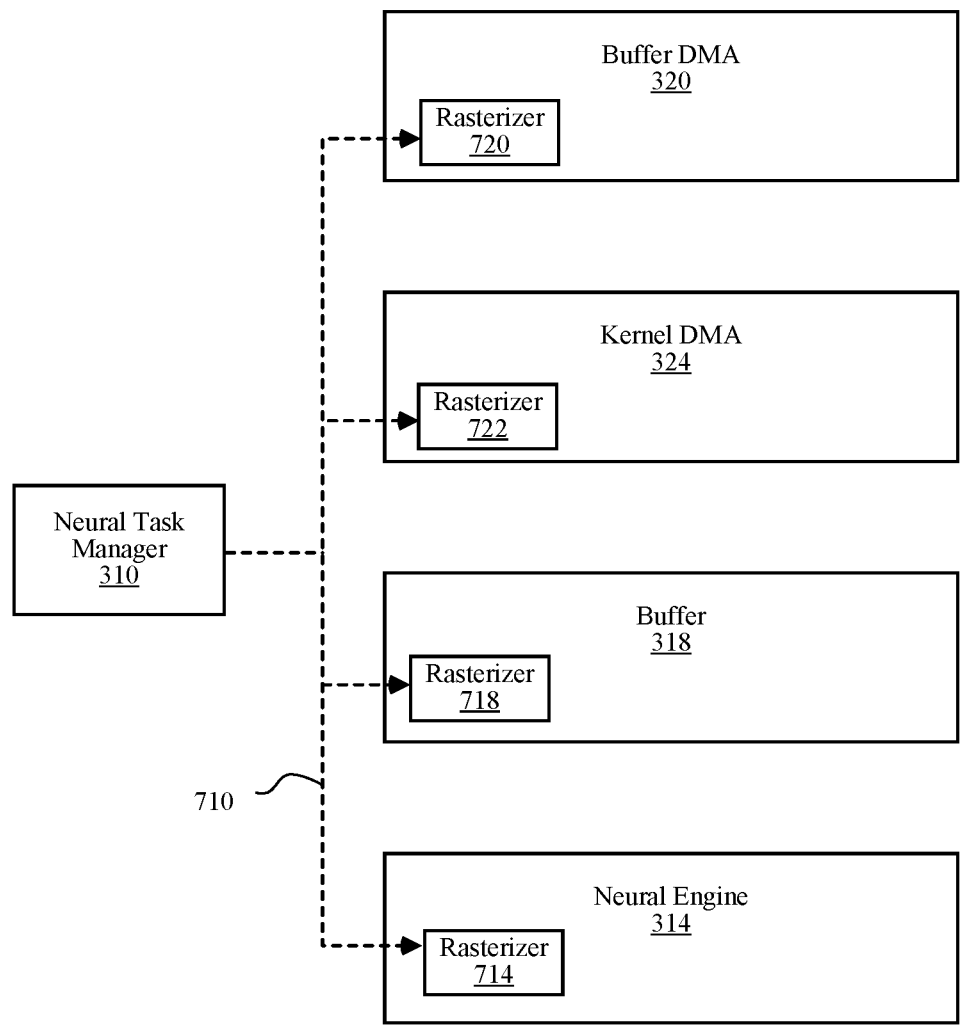
FIG. 7 is a diagram illustrating programming of rasterizers in components of the neural processor circuit, according to one embodiment.

FIG. 7 is a diagram illustrating programming of rasterizers 714, 718, 720, 722 in components 314, 318, 320, 322 of the neural processor circuit 218, according to one embodiment. To perform their functions, each of rasterizers 714, 718, 720, 722 receives task information 710 indicating how the input data and/or kernel data are to be segmented and to be handled by each component of the neural processor circuit 218. The task information includes information about particulars of the current layer (e.g., dimensions of input and output data, dimension of an associated kernel, types of padding at the boundaries of input data). Rasterizers 714, 718, 720, 722 may also receive constraints on their operations (e.g., whether to allow or disallow tile width over a threshold).

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify associated position in the loops of the task such as convolution group, tile, slice, work unit, input channel and output channel. By using distributed rasterizers, no separate metadata is needed to transmit the kernel data, input data and output data among components of the neural processor circuit 218.

Example Process at Neural Engine Architecture

Figure 8:
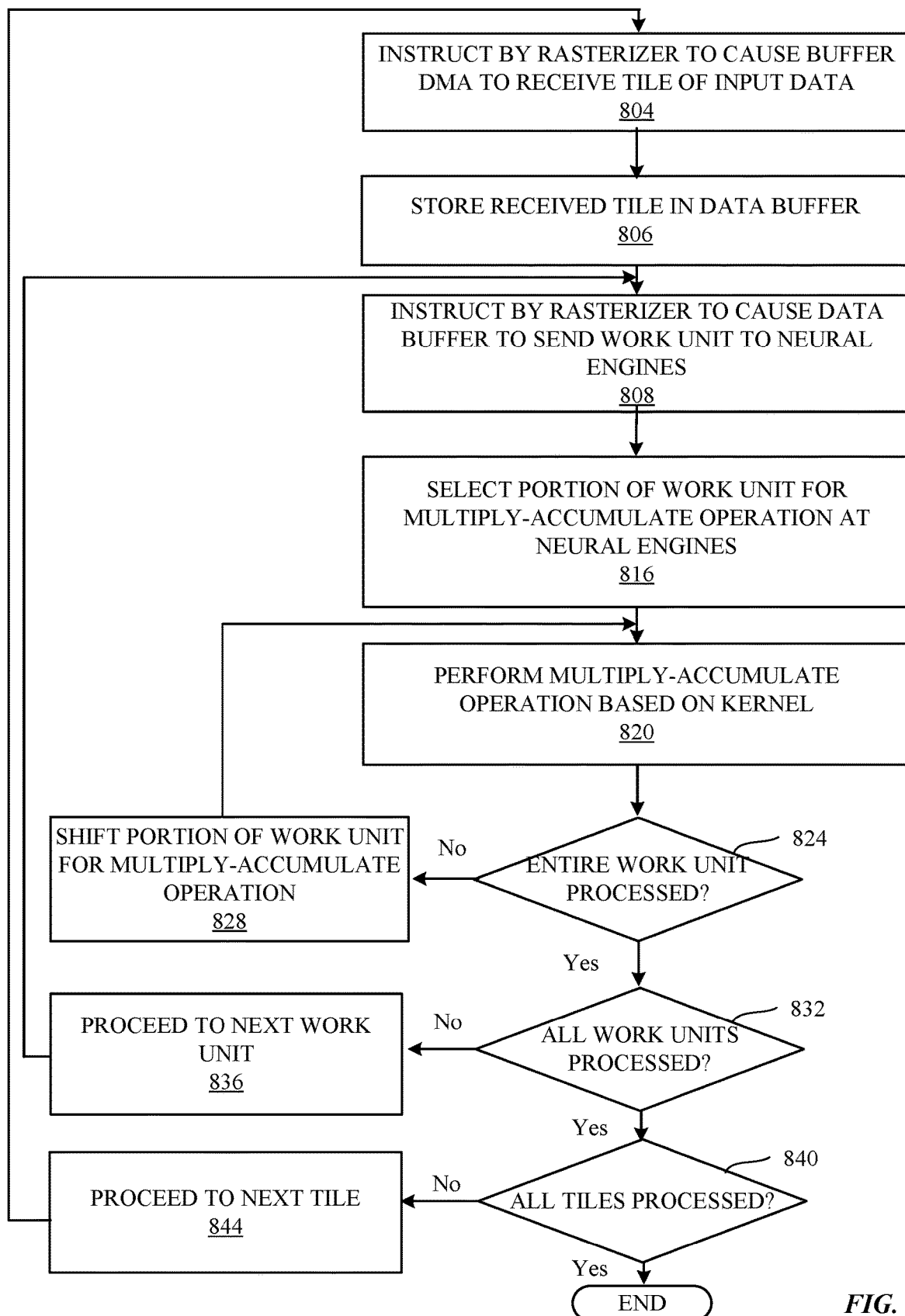
FIG. 8 is a flowchart illustrating a method of processing input data in a neural processor circuit, according to one embodiment.

FIG. 8 is a flowchart illustrating a method of processing input data in neural processor circuit 218, according to one embodiment. After neural task manager 310 programs rasterizers 714, 718, 720, 722, the process of operating buffer DMA 320 is initiated by rasterizer 720 instructing 804 buffer DMA 320 to cause buffer DMA 320 to receive a tile of input data from system memory 230. The tile received by buffer DMA 320 is stored 806 in data buffer 318.

Rasterizer 718 in data buffer 318 then instructs 808 data buffer 318 to send a work unit to one or more neural engines 314. The work unit is then stored in input buffer circuits 402 of the one or more neural engines 314.

In one or more embodiments, input buffer circuit 402 selects 816 a portion of work unit to be sent to MAC 404 to perform multiply-accumulate operation. Then MAC 404 performs 820 multiply-accumulate operations on the selected portion of the work unit using a corresponding kernel. Then it is determined 824 if the entire work unit is processed at one or more neural engines 314. If not, the selected portion of the work unit is shifted 828 by shifter 410 and returns to perform 820 another round of multiply-accumulate operations.

If it is determined 824 that the entire work unit was processed, then it proceeds to determine 832 if all work units in the tile was processed. If not, then the process proceeds 836 to the next work unit by having data buffer 318 send 808 a next work unit to one or more neural engines 314, and repeats the subsequent processes.

If it is determined 832 that all work units in the tile was processed by the neural engines 314, the process proceeds to determine 840 whether all tiles for the input data were processed. If not, the process proceeds 844 to a next tile by having rasterizer 720 instructs 804 buffer DMA 320 to receive a next tile from system memory 230 and repeats the subsequent processes.

If it is determined 840 that all tiles of the input data are processed, then the process ends for the current input data. Then, the process may repeated to process the next input data or proceed to the next task.

Embodiments of the process as described above with reference to FIG. 8 are merely illustrative. Further loops may be embodied, as described above with reference to FIG. 5. Moreover, sequence of the process may be modified or omitted.

Example Operation Modes for Neural Engine

The neural processor circuit 218 supports different operation modes including non-group convolution modes and group convolution modes. In a typical convolution (i.e., non-group convolution), all the input channels contribute to all the output channels. When the neural processor circuit 218 operates in a non-group convolution mode, the convolution operation is performed without dividing the convolution operation into multiple independent convolution operations. Conversely, in a group convolution, a non-overlapping subset of input channels contributes to a non-overlapping subset of output channels. When the neural processor circuit 218 operates in a group convolution mode, a convolution operation is divided into multiple independent convolution operations for execution by the neural engines.

Figure 9:
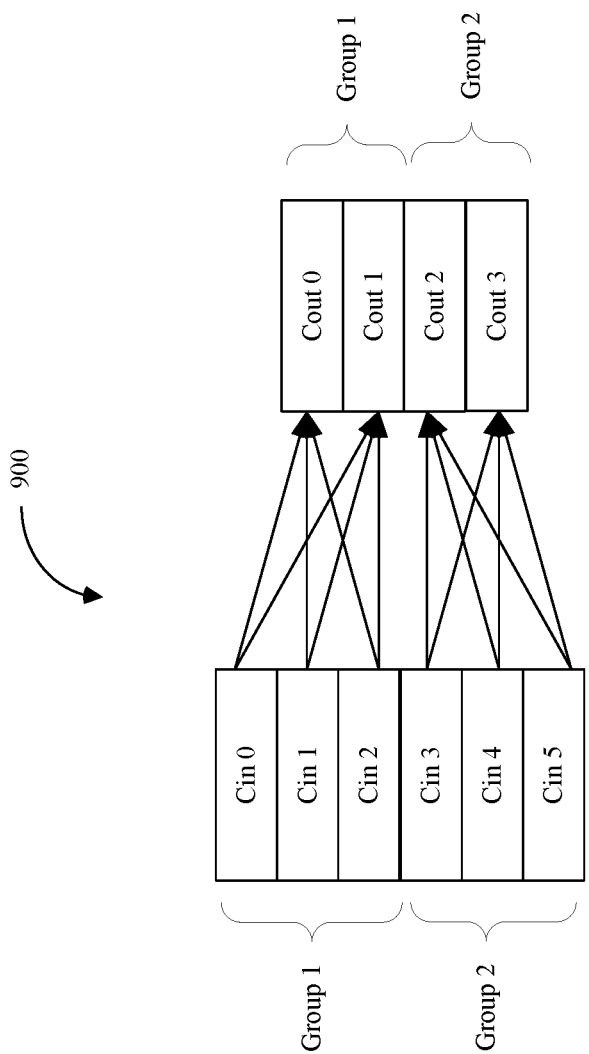
FIG. 9 is a conceptual diagram illustrating input and output channels for group convolutions, according to one embodiment.

FIG. 9 is a conceptual diagram illustrating dividing a convolution operation 900 into two group convolutions Group 1 and Group 2, according to one embodiment. The convolution operation 900 shown in FIG. 9 receives input data from input channels Cin0 through Cin5 and generates output data to output channels Cout0 through Cout3. The convolution operation 900 shown in FIG. 9 may be split into two smaller group convolutions Group 1 and Group 2. For example, the input channels Cin0, Cin1, and Cin2 contribute only to the output channels Cout0 and Cout1, so the input channels Cin0 through Cin2 and output channels Cout0 and Cout1 correspond to a first group convolution, Group 1. The input channels Cin3, Cin4, and Cin5 contribute only to output channels Cout2 and Cout3, so the input channels Cin3 to Cin5 and output channels Cout2 and Cout3 correspond to a second group convolution, Group 2. Thus, the convolution shown in FIG. 9 is split into Group 1 and Group 2, which can be deemed as two independent convolution operations.

Figure 10A:
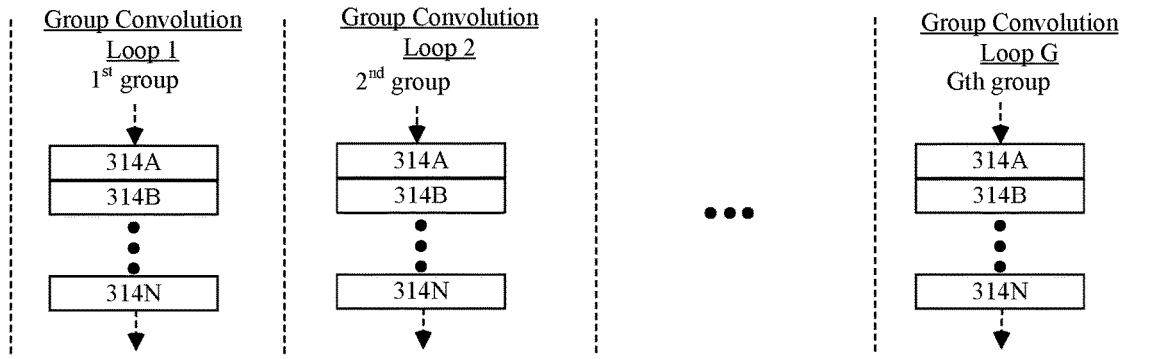
FIG. 10A is a conceptual diagram illustrating a group convolution mode in which independent convolution operations are executed sequentially by neural engines, according to one embodiment.

FIG. 10A is a conceptual diagram illustrating a group convolution mode in which independent convolution operations are executed sequentially by neural engines 314A through 314N, according to one embodiment. FIG. 10A shows group convolution loops 1 through G (e.g., the outermost loop of FIG. 5) where each group convolution loop processes a single group convolution. For each group convolution loop, various other internal loops are performed as described above in detail with reference to FIG. 4. Each group convolution loop is performed sequentially in a non-overlapping manner (e.g., group convolution loop 1 followed by group convolution loop 2 followed by group convolution loop 3, and so forth).

In group convolution loop 1, the $1^{st}$ group is processed by neural engines 314A through 314N. The upper arrow represents a first set of input channels of the $1^{st}$ group, and the lower arrow represents a first set of output channels of the $1^{st}$ group. In group convolution loop 2, the $2^{nd}$ group is processed by neural engines 314A through 314N using a second set of input channels and generating a second set of output channels. Different sets of input channels and output channels are associated with the neural engines 314A through 314N in each group convolution loop. In group convolution loop G, the Gth group is processed by neural engines 314A through 314N.

In this way, the multiple independent convolution operations (e.g., $1^{st}$ through Gth group) are executed sequentially by the neural engines 314A through 314N in the group convolution loops 1 through G. In this embodiment, for each group convolution loop all neural engines 314A through 314N operate on the same set of input and output channels of an independent group convolution operation during the same group convolution loop, while different sets of input and output channels applied during different group convolution loops.

When operating in the convolution mode illustrated in FIG. 10A, the data buffer 318 can be operated in a broadcast mode where data input data of all input channels are fed to all neural engines 314A through 314N. Each of the neural engines 314A through 314G can receive different kernels from the kernel access circuit (e.g., kernel DMA 324). Alternatively, each of the neural engines 314A through 314G may receive the same kernel from the kernel access circuit (also known as a "batch mode"). A batch mode may operate using group kernel reuse and/or kernel rewind.

In group kernel reuse, the neural engines 314 reuse kernels already stored in kernel memory across groups within a task. The kernel access circuit would only have to access a kernel data from external memory once across groups within a task that would use the same kernel. For example, the group convolutions shown in FIG. 10A may be implemented as one task with multiple groups (e.g., $1^{st}$ through Gth group is one task). A neural engine 314A may use a same kernel in group convolution loop 1 and group convolution loop 2. In group convolution loop 1, the neural engine 314A receives a kernel data from the kernel access circuit. In group convolution loop 2, the neural engine 314A may reuse the same kernel data that is stored in kernel memory instead of receiving the same kernel data from the kernel access circuit. In this way, group kernel reuse is more efficient by reducing a number of times the kernel access circuit fetches kernel data from external memory when a same kernel data is used for a neural engine in group convolution loops of one task. In kernel rewind, the neural engines 314 reuse kernels already stored in kernel memory across multiple tasks. The kernel access circuit would only have to access kernel data from external memory once across multiple task that would use the same kernel. For example, the group convolutions shown in FIG. 10A, may be implemented as multiple tasks with one group each (e.g., each of $1^{st}$ through Gth group is a task). In group convolution loop 1, the $1^{st}$ group is a first task, and the neural engine 314A receives a kernel data from the kernel access circuit for that task. In group convolution loop 2, the $2^{nd}$ group convolution is a second task which may use the same kernel data as the first task, and the neural engine 314A may reuse the kernel data stored in kernel memory instead of receiving the same kernel data from the kernel access circuit. In this way, kernel rewind is more efficient by reducing a number of times the kernel access circuit fetches kernel data from external memory when a same kernel data is used for a neural engine in group convolution loops across multiple tasks. A batch mode may operate using both group kernel reuse and kernel rewind when there is one task with multiple group convolutions and multiple tasks with one group each. For example, the group convolutions shown in FIG. 10A may be implemented as one task with multiple group convolutions (e.g., group convolution loops 1 and 2 are one task) while other group convolutions are implemented as separate tasks (e.g., subsequent group convolution loops to group convolution loop G are each multiple tasks), and a batch mode may operate using group kernel reuse (e.g., for group convolution loops 1 and 2) and kernel rewind (e.g., for subsequent group convolution loops).

Figure 10B:
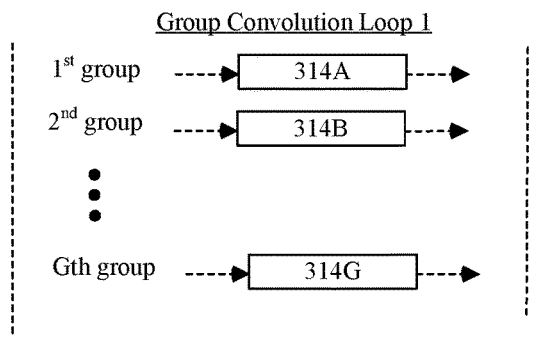
FIG. 10B is a conceptual diagram illustrating a group convolution mode in which independent convolution operations are executed in parallel by neural engines, according to one embodiment.
Figure 10C:
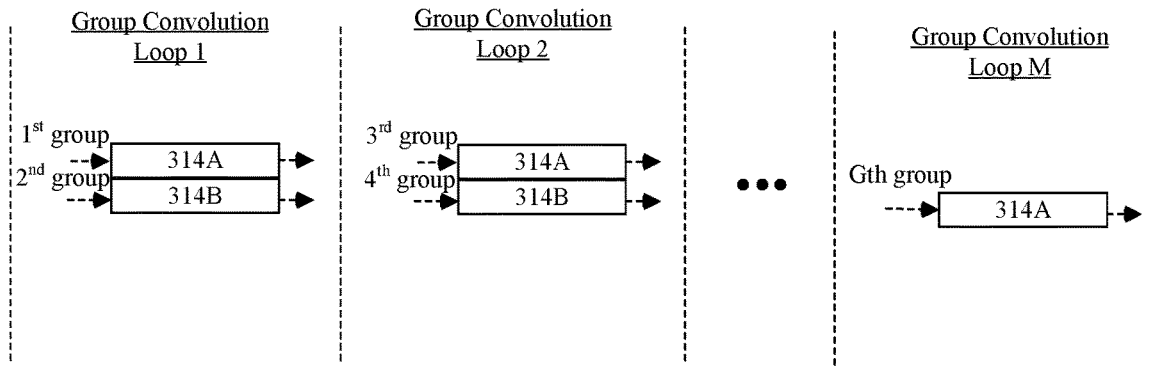
FIG. 10C is a conceptual diagram illustrating a group convolution mode in which at least a subset of independent convolution operations are executed in parallel by neural engines, according to one embodiment.

FIG. 10B is a conceptual diagram illustrating a group convolution mode in which independent convolution operations are executed in parallel by neural engines 314A through 314N, according to one embodiment. In this example, the number of neural engines is assumed to be larger than the number of group of group convolutions (i.e., N>G). FIG. 10C shows a single group convolution loop 1 (e.g., the outermost loop of FIG. 5) where multiple group convolutions are processed by corresponding neural engines 314A through 314N.

In group convolution loop 1 of FIG. 10B, the $1^{st}$ group is processed by neural engine 314A, the $2^{nd}$ group is processed by neural engine 314B, and so on until the Gth group is processed by neural engine 314G. In this way, the multiple independent convolution operations (e.g., $1^{st}$ group to Gth group) are executed in parallel by the neural engines 314A through 314G in a single group convolution loop. In this embodiment, each neural engines 314A through 314G have different input channels (represented by arrows in the left) and output channels (represented by arrows in the right). The data buffer 318 can be operated in a unicast mode where data input data of a subset of input channels are fed to each neural engine 314.

As described above with reference to FIG. 10A, each of the neural engines 314A through 314G can receive different kernels or the same kernel in this group convolution mode.

Although the example shown in FIG. 10B depicts each group convolution being processed by a corresponding neural engine, other embodiments may have multiple neural engines processing a single group convolution, or a single neural engine processing multiple group convolutions. For example, neural engine 314A and 314B may process a $1^{st}$ group, or neural engine 314A may process a $1^{st}$ group and a $2^{nd}$ group.

FIG. 10C is a conceptual diagram illustrating a group convolution mode in which at least a subset of independent convolution operations are executed in parallel by neural engines 314A, 314B, according to one embodiment. FIG. 10C shows group convolution loops 1 through M (e.g., the outermost loop of FIG. 5) where multiple group convolutions are processed by one or more neural engines 314A, 314B during a single group convolution loop. Each group convolution loop is performed sequentially in a non-overlapping manner (e.g., group convolution loop 1 followed by group convolution loop 2 followed by group convolution loop 3, and so forth).

In group convolution loop 1, the input channels (represented by an arrow extending to the neural engine 314A in FIG. 10C) associated with the $1^{st}$ group is fed to neural engine 314A to produce first output channels (represented by an arrow extending from the neural engine 314A in FIG. 10D) while the input channels (represented by an arrow extending to the neural engine 314B in FIG. 10D) associated with the $2^{nd}$ group are processed by neural engine 314B to produce second output channels (represented by an arrow extending from the neural engine 314B in FIG. 10C). In the group convolution loop 2, the $3^{rd}$ group and $4^{th}$ group are processed by neural engines 314A and 314B in similar way as the group convolution loop 1. Thus, two independent convolution operations are executed in parallel by the neural engines 314A and 314B in a single loop (e.g., group convolution loop 1, group convolution loop 2). In the last group convolution loop M, only one group convolution (Gth group) remain, and hence, only one neural engine 314A is used to receive associated input channels and generate output channels.

Each of the neural engines 314A and 314B may receive different portions of input data from the data buffer 320 via unicast. Each of the neural engines 314A and 314B may receive different kernels or the same kernel from the kernel access circuit (e.g., kernel DMA 324).

Although the example shown in FIG. 10C depicts two group convolutions corresponding to two neural engines for processing, a different number of group convolutions can be processed by a different number of corresponding neural engines. For example, a $1^{st}$ group, $2^{nd}$ group, and $3^{rd}$ group may be processed by neural engines 314A and 314B, or a $1^{st}$ group and a $2^{nd}$ group may be processed by neural engines 314A, 314B, and 314C.

Figure 11:
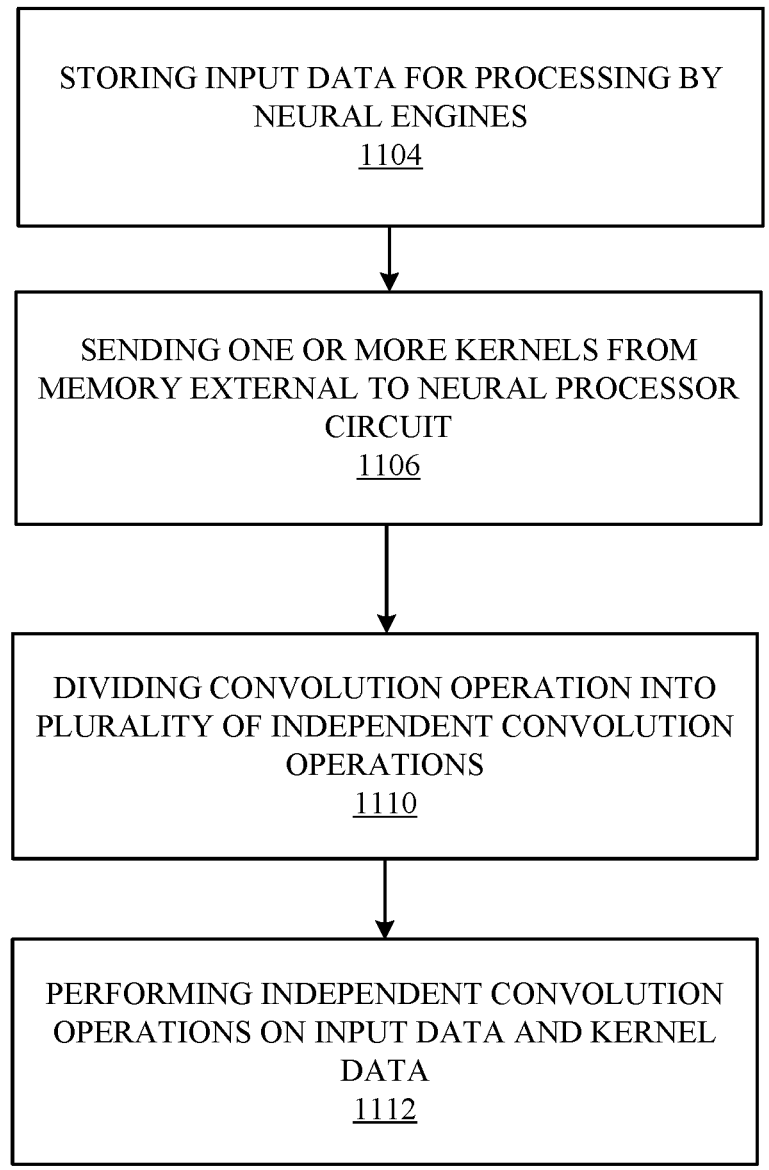
FIG. 11 is a flowchart illustrating a method of processing group convolutions, according to one embodiment.

FIG. 11 is a flowchart illustrating a method of processing group convolutions, according to one embodiment. In this embodiment, a buffer (e.g., data buffer 318) stores 1104 input data (e.g., input data 322) for processing by the neural engines (e.g., neural engines 314). For example, data buffer 318 may store input data 322A through 322N for feeding to corresponding neural engines 314A through 314N. Data buffer 318 may be operated in a broadcast mode where data input data of all input channels are fed to all neural engines 314 or in a unicast mode where data input data of a subset of input channels are fed to each neural engine 314.

The kernel access circuit (e.g., kernel DMA 324) sends 1106 one or more kernels (e.g., kernel data 326) from memory external to the neural processor circuit (e.g., system memory 230). In some embodiments, the same kernel is sent to all of the neural engines 314 (e.g., batch mode). In other embodiments, a different kernel is sent to each neural engines 314A through 314N.

The neural processor circuit (e.g., neural processor circuit 218) divides 1110 a convolution operation into a plurality of independent convolution operations (e.g., group convolutions). Each independent convolution operation has a non-overlapping subset of input channels contributing to a non-overlapping subset of output channels.

The neural engines performs 1112 independent convolution operations on input data and kernel data. The neural engines may perform the independent convolution operations sequentially. For example, a group convolution loop as described with reference to FIG. 5 performs each of the plurality of independent convolution operation sequentially, each group convolution loop processing a single convolution. All neural engines 314A through 314N may operate on the same set of input and output channels of an independent convolution operation during a same group convolution loop, while different sets of input and output channels applied during different group convolution loops. The data buffer 318 may be operated in a broadcast mode where data input data of all input channels are fed to all neural engines 314A through 314N. The neural engines may perform at least a subset of the independent convolution operations in parallel. For example, a group convolution loop as described with reference to FIG. 5 may perform at least a subset of the independent convolution operations in parallel by more than one neural engine in a single group convolution loop. Each neural engines 314A through 314G may have different input channels and output channels. The data buffer 318 can be operated in a unicast mode where data input data of a subset of input channels are fed to each neural engine 314.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
   a plurality of neural engines configured to perform convolution operations on input data and kernel data to generate output data;
   a buffer between the plurality of neural engines and a memory external to the neural processor circuit, the buffer configured to store the input data for sending to the neural engines and output data received from the neural engines; and
   a kernel access circuit configured to receive one or more kernels from the memory external to the neural processor circuit, the kernel access circuit configured to send a corresponding kernel to the neural engines, wherein the neural processor circuit is configured to operate in a group convolution mode where a plurality of group convolutions are divided into independent convolutions for execution by the neural engines, each of the independent convolutions comprises convolutions for an output channel group, the convolutions for the output channel group comprising convolutions of input channels.

2. The neural processor circuit of claim 1, wherein the plurality of independent convolutions are executed sequentially by the neural engines.

3. The neural processor circuit of claim 2, wherein in the group convolution mode, each of the neural engines receives a different kernel from the kernel access circuit.

4. The neural processor circuit of claim 1, wherein at least a subset of the independent convolutions is performed in parallel by the neural engines.

5. The neural processor circuit of claim 4, wherein in the group convolution mode, each of the neural engines receives different portions of input data from the buffer via unicast and different kernels from the kernel access circuit.

6. The neural processor circuit of claim 1, wherein, each of the independent convolutions is performed by the neural engines that receives a same kernel from the kernel access circuit.

7. The neural processor circuit of claim 1, wherein the neural processor circuit is further configured to operate in a non-group convolution mode where a convolution is performed without dividing the convolution into a plurality of independent convolutions.

8. The neural processor circuit of claim 1, wherein one or more of the neural engines, the buffer and the kernel access circuit include a rasterizer circuit configured to track portions of the input data corresponding to the independent convolutions, portions of the kernel data corresponding to the independent convolutions or portions of the output data corresponding to the independent convolutions.

9. A method of performing a neural operation in a neural processor circuit, the method comprising:
   placing the neural processor circuit in a group convolution mode where a plurality of group convolutions are divided into independent convolutions, each of the independent convolutions comprises convolutions for an output channel group, the convolutions for the output channel group comprising convolutions of input channels;
   executing the independent convolutions by a plurality of neural engines in the neural processor;
   placing the neural processor circuit in a non-group convolution mode in which a convolution is not divided into independent convolutions; and
   executing the convolution by the plurality of neural engines.

10. The method of claim 9, wherein the plurality of independent convolutions are executed sequentially by the neural engines in the group convolution mode.

11. The method of claim 9, wherein at least a subset of the plurality of independent convolutions are executed in parallel by the neural engines in the group convolution mode.

12. The method of claim 9, further comprising placing the neural processor circuit in a batch mode in which the neural engines are provided with a same kernel.

13. The method of claim 9, further comprising tracking portions of the input data corresponding to the independent convolutions using a rasterizer circuit in at least one of the neural engines or a buffer storing input data for sending to the neural engines.

14. An integrated circuit (IC) system comprising a neural processor circuit, the neural processor circuit comprising:
   a plurality of neural engines, the neural engines configured to perform convolution operations on input data and kernel data to generate output data;
   a buffer between the plurality of neural engines and a memory external to the neural processor circuit, the buffer configured to store the input data for sending to the neural engines and output data received from the neural engines; and
   a kernel access circuit configured to receive one or more kernels from the memory external to the neural processor circuit, the kernel access circuit configured to send a corresponding kernel to the neural engines, wherein the neural processor circuit is configured to operate in a group convolution mode where a plurality of group convolutions are divided into independent convolutions for execution by the neural engines, each of the independent convolutions comprises convolutions for an output channel group, the convolutions for the output channel group comprising convolutions of input channels.

15. The IC system of claim 14, wherein the plurality of independent convolution operations are executed sequentially by the neural engines, and each of the neural engines receives a different kernel from the kernel access circuit.

16. The IC system of claim 15, wherein each of the neural engines receives a different kernel from the kernel access circuit.

17. The IC system of claim 14, wherein at least a subset of the independent convolutions is performed in parallel by the neural engines, and each of the neural engines receives different portions of input data from the buffer via unicast and different kernels from the kernel access circuit.

18. The IC system of claim 14, wherein each of the independent convolution operations is performed by the neural engines that receives a same kernel from the kernel access circuit.

19. The IC system of claim 14, wherein the neural processor circuit is further configured to operation in a non-group convolution mode where a convolution is performed without dividing the convolution into a plurality of independent convolution operations.

20. The IC system of claim 14, wherein one or more of the neural engines, the buffer and the kernel access circuit include a rasterizer circuit configured to track portions of the input data corresponding to the independent convolutions, portions of the kernel data corresponding to the independent convolutions or portions of the output data corresponding to the independent convolutions.

* * * * *

UNITED STATES PATENT AND TRADEMARK OFFICE
CERTIFICATE OF CORRECTION

PATENT NO. : 11,200,490 B2
APPLICATION NO. : 15/971635
DATED : December 14, 2021
INVENTOR(S) : Sung Hee Park et al.

It is certified that error appears in the above-identified patent and that said Letters Patent is hereby corrected as shown below:

In the Claims

In Column 18, Claim 19, Line 35: delete "operation" and insert --operate--

Signed and Sealed this
Tenth Day of May, 2022

Katherine Kelly Vidal
*Director of the United States Patent and Trademark Office*